Figures 1, 2:
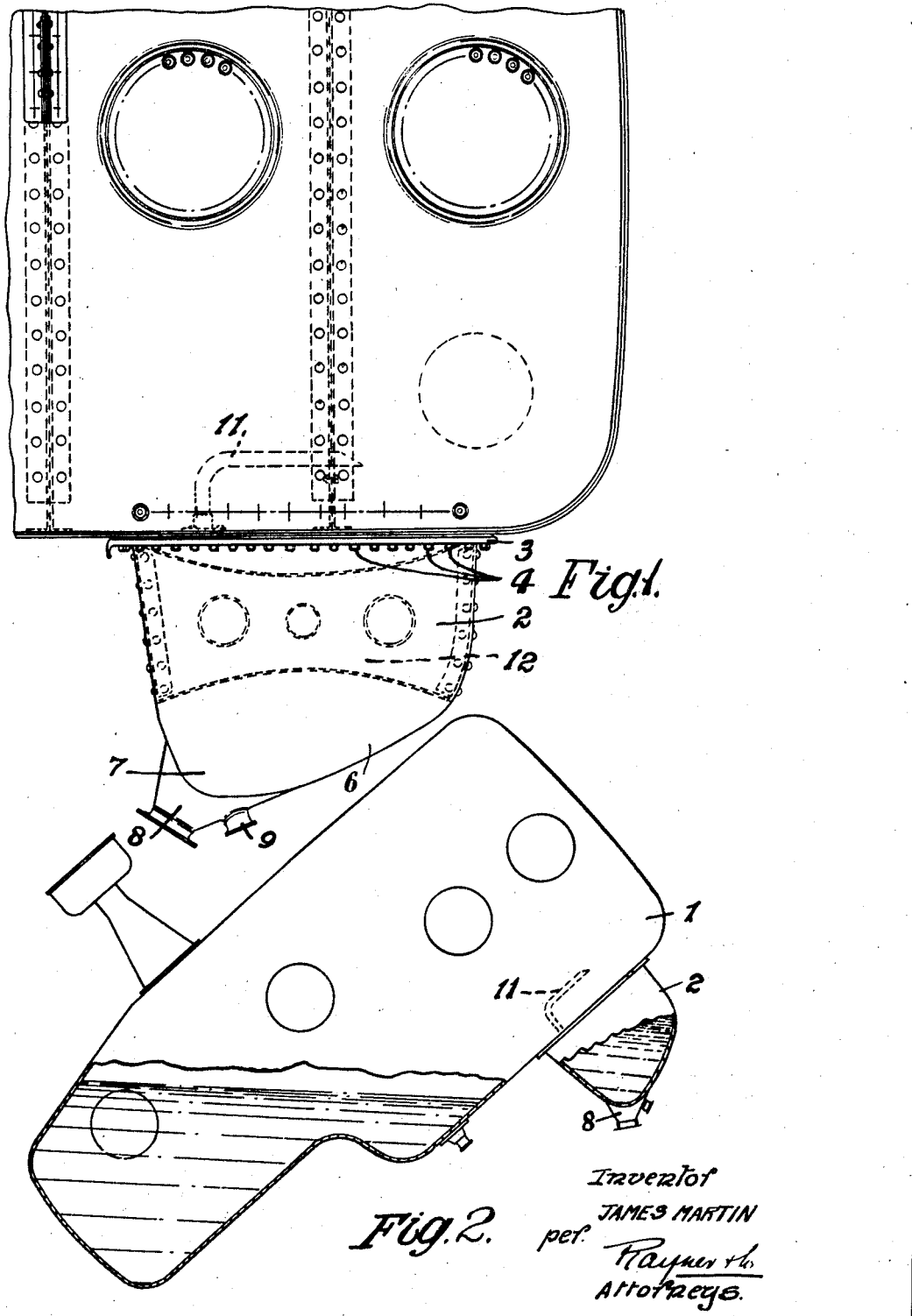

Jan. 4, 1944.     J. MARTIN     2,338,450
LIQUID FUEL TANK FOR AIRCRAFT
Filed March 9, 1942     2 Sheets-Sheet 1

Inventor
JAMES MARTIN
per Rayner &
Attorneys.

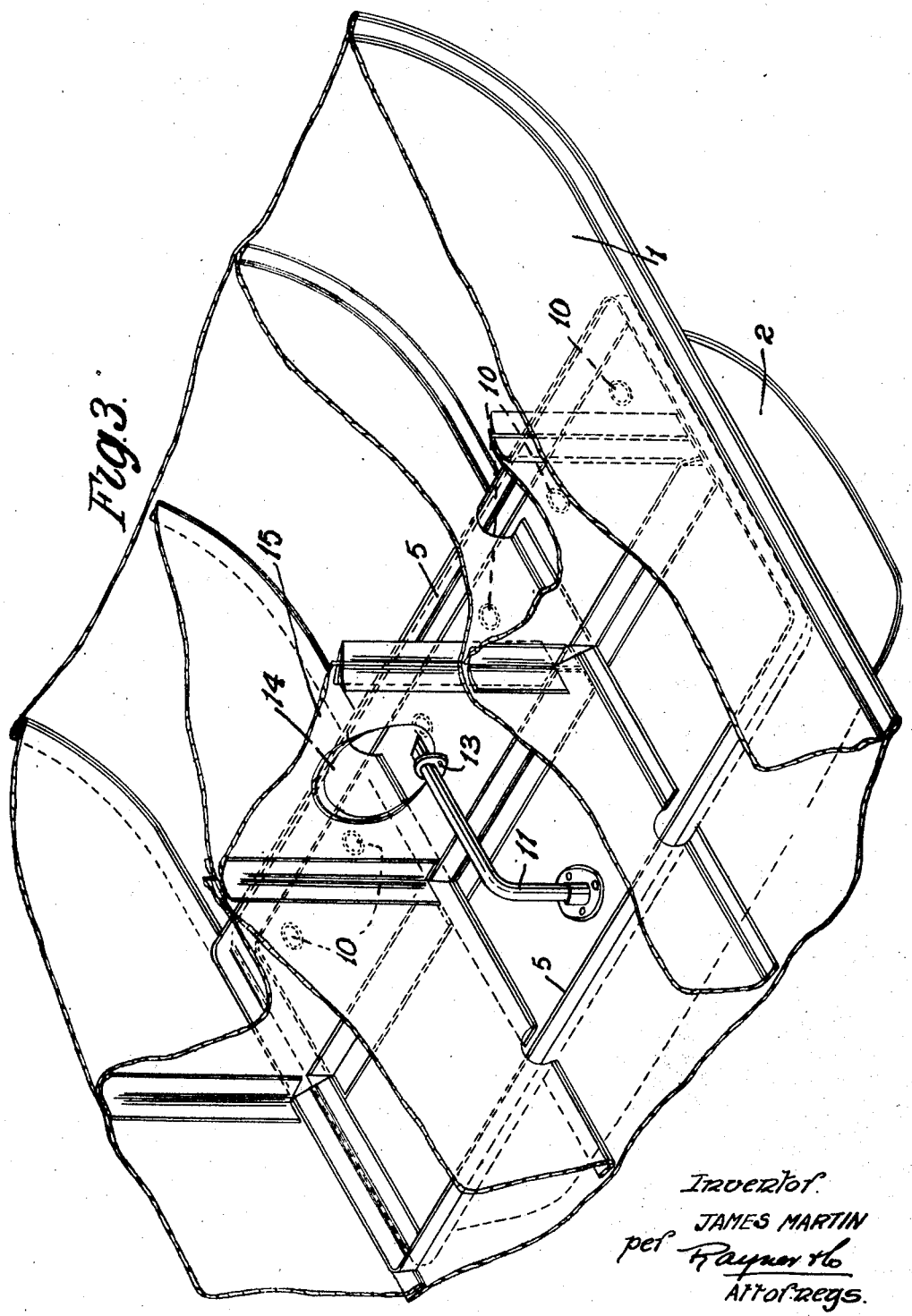

Patented Jan. 4, 1944

2,338,450

UNITED STATES PATENT OFFICE 2,338,450

LIQUID FUEL TANK FOR AIRCRAFT

James Martin, Higher Denham, near Uxbridge, England

Application March 9, 1942, Serial No. 434,014
In Great Britain March 15, 1941

5 Claims. (Cl. 158—46)

This invention relates to liquid fuel tanks for aircraft. In modern aircraft, particularly fighter and bomber aeroplanes, the aircraft is frequently dived steeply over protracted periods which causes the liquid fuel in the tank to rush to the forward end of the tank and with certain forms of liquid fuel feed, particularly petrol feed to carburetors this is found to produce a somewhat erratic and sometimes interrupted supply of petrol to the carburetors. The object of this invention is to provide a simple and reliable arrangement with liquid fuel tanks for aircraft which will eliminate this disadvantage and will afford ample supply of liquid fuel for the most protracted dive, whilst eliminating complicated or expensive fitments or interfering with the normal function or capacity of the tank.

In a preferred form of this invention a liquid fuel tank for aircraft comprises a main or normal container and a supplementary container of large capacity formed as a depending sump in the rear of the base of the main container and in constant communication with the interior of the main container by means of an aperture or apertures at the rear end of the upper part of the supplementary container, the supplementary container having the outlet to the carburetor or equivalent consuming means connected thereto, said outlet being located at the forward end of the base of the supplementary container.

The tank can be of any desired configuration with the customary filler located on its top, a most convenient configuration being one in which the tank has a substantially flat base and sides or a flat base at its rear part. By "large capacity" is contemplated a supplementary container adapted to contain a supply of petrol more than adequate to ensure a constant supply of petrol to the engine or engines during the most protracted dive say from 5 per cent to 10 per cent of the capacity of the main container. For example a supplementary container of about seven and a half gallons is contemplated with a tank having a normal full capacity e. g. of about one hundred and twenty gallons. This example is intended to apply to a fuel tank for a single-seater single engine "fighter" aeroplane.

In order that this invention may be clearly understood and readily carried into effect drawings are appended hereto illustrating an embodiment thereof, and wherein, Fig. 1 is a broken side elevation of the rear part of an aeroplane petrol tank with the sump or supplementary container fitted thereto.

Fig. 2 is a side elevation view to a smaller scale showing how the sump or supplementary container remains fully charged when the aeroplane goes into a steep dive, and Fig. 3 is a detail perspective view showing the arrangement of vent pipe, and filling apertures at the rear end of the base of the main container.

Referring to the drawings the improved tank comprises a main container 1 of any suitable configuration, the configuration shown being purely by way of example, and a supplementary container 2 wholly subjacent to the container 1 and fixed to the rear end of the base of the container 1. This supplementary container can be secured to the base of the tank proper 1 by an upper flange 3, through which and the base of the tank 1 are passed bolts or rivets 4, an internal angle section strip 5 being butted against the base and side walls of the tank 1 in alignment with the flange 3 to afford stiffening and adequate material for the reception of the bolts or rivets.

The supplementary container 2 extends substantially the full width of the tank 1 and preferably has slightly converging side walls which merge into a trough-like base 6 having a bulbous or nose-like forwardly located lowest part 7 which contains the outlet 8 to the carburetor or other consuming unit. This outlet 8 has an axis inclined downwardly and forwardly at such angle as to ensure a substantially vertical or pronounced downward flow of petrol when the aeroplane dives, as shown in Fig. 2. A drainage plug 9 can be provided near this outlet.

The supplementary container is closed from the tank or main container 1 with the exception of a transverse row of holes 10 located in the base of the tank 1 close to the rear wall of the supplementary container, and an air vent pipe 11 extending upwards and rearwards from the supplementary container near the front wall thereof, this vent pipe having its open free end extending into the rear part of the tank 1. The holes 10 ensure complete filling of the supplementary container during climbing or normal flight so long as there is any petrol in the tank 1, the vent pipe 11 obviating the trapping of air in the supplementary container, and also by reason of its shape and direction preventing it from being bled whilst the aeroplane is diving.

The supplementary container can be stiffened internally by webs 12, and the vent pipe 11 can be supported near its free or rear end by a small bracket 13 fitted to the rim of one of the usual apertures 14 in one of the baffles or partitions 15 in the tank 1. It will be appreciated that the supplementary container is not in the nature of an emergency or reserve tank to be tapped when the normal supply of liquid fuel fails or becomes exhausted but is in fact a normally completely charged reservoir between the normal tank and the carburetors or other consuming means, and is so shaped and located as to prevent interruption of normal supply of liquid fuel to the engine when the liquid fuel in the tank 1 is tilted away from the outlet. Instead of a row of apertures 10 one or more narrow slots can be provided in the base of the tank 1.

I claim:

1. A liquid fuel tank for aircraft comprising a main container and a supplementary container of large capacity formed as an integral depending sump located entirely at the trailing end of the base of the main container, an opening to permit constant communication with the interior of the main container comprising at least one aperture at the rear end of the upper part of the supplementary container, an outlet for connection to the carburetor or equivalent consuming means located at the forward end of the base of the supplementary container, a vent pipe extending upwardly and rearwardly from the supplementary container into the interior of the main container.

2. A liquid fuel tank for an aeroplane, comprising a main container of approximately rectangular form, a supplementary container having a capacity of from 5 per cent to 10 per cent of the main container and located beneath the main container, a partition entirely separating the main and supplementary containers with the exception of a relatively small opening near the rear ends of the containers, a vent pipe communicating with the interior of the supplementary container and extending upwardly and rearwardly and opening into the rear end of the main container, a small sump located below the forward part of the supplementary container and communicating with the interior thereof and an outlet connection to this sump for connecting the fuel tank to the means for supplying fuel to the engine of the aeroplane.

3. In a liquid fuel tank for aircraft the provision of means to retain an adequate reserve of liquid fuel at the trailing end of the tank when the aircraft is in a steep dive so that the engine will receive its supply of liquid fuel from such reserve during a dive, said means comprising a depending sump of large fuel capacity at the trailing end of the base of the tank and in constant communication with the interior of the tank so that normally and during climbing the whole of the liquid fuel in the tank and sump is available as a single source of supply, the base of the tank comprising the top wall of said sump and being apertured at the rear part of said sump to afford the said communication, whereby such top wall of the sump isolates the liquid fuel in the said depending sump from the main tank during a dive, and an outlet in the forward part of the base of said sump for connection to the carburetor or other liquid fuel consuming means.

4. In a liquid fuel tank for aircraft the provision of means to retain an adequate reserve of liquid fuel at the trailing end of the tank when the aircraft is in a steep dive so that the engine will receive its supply of liquid fuel from such reserve during a dive, said means comprising a depending sump of large fuel capacity at the trailing end of the base of the tank and separated therefrom by a wall which isolates supply of liquid fuel from the interior of the main tank excepting for an opening located in said wall between the main tank and said sump, said opening being positioned at the rear of said sump so that normally and during climbing the whole of the liquid fuel in the tank and sump is available as a single source of supply, but when the aircraft dives, said wall prevents the liquid fuel in the said sump from flowing into the front end of the tank, an outlet in the base of said sump for connection to the carburetor, and an air or gas vent pipe for the said sump extending rearwardly from an opening in said wall to a position in the rear part of the main tank.

5. In a liquid fuel tank for aircraft the provision of means to retain an adequate reserve of liquid fuel at the trailing end of the tank when the aircraft is in a steep dive so that the engine will receive its supply of liquid fuel from such reserve during a dive, said means comprising a depending sump of large fuel capacity at the trailing end of base of the tank and in constant communication with the interior of the tank so that normally and during climbing the whole of the liquid fuel in the tank and sump is available as a single source of supply, the base of the tank comprising the top wall of said sump and being apertured at the rear part of said sump to afford the said communication, whereby such top wall of the sump isolates the liquid fuel in the said sump from the main tank during a dive, a downwardly and forwardly projecting nose-like base to said sump and outlet for connection to the carburetor or other liquid fuel consuming means located substantially in the foremost part of said base of the sump.

JAMES MARTIN.